United States Patent [19]

Young

[11] Patent Number: 4,479,246
[45] Date of Patent: Oct. 23, 1984

[54] COMMUNICATION SYSTEM TO SIMULTANEOUSLY OPERATE A PLURALITY OF RF TRANSCEIVERS IN A CONFINED AREA

[75] Inventor: Michael F. Young, Staten Island, N.Y.

[73] Assignee: Buttonwood Communication Corporation, Staten Island, N.Y.

[21] Appl. No.: 527,199

[22] Filed: Aug. 29, 1983

Related U.S. Application Data

[63] Continuation of Ser. No. 286,256, Jul. 31, 1981.

[51] Int. Cl.³ .................... H04B 1/50; H04B 15/00
[52] U.S. Cl. .................................. 455/50; 455/56; 455/63; 455/89
[58] Field of Search .................. 455/49, 50, 52–54, 455/56, 62, 63, 80, 103, 315, 89; 333/130; 343/870.12

[56] References Cited

U.S. PATENT DOCUMENTS

| | | | |
|---|---|---|---|
| 2,409,208 | 10/1946 | Holst et al. | 455/50 |
| 2,572,235 | 10/1951 | Young, Jr. | 455/50 |
| 3,327,215 | 6/1967 | Battin et al. | 455/80 |
| 4,322,856 | 3/1982 | Ohta et al. | 455/315 X |

OTHER PUBLICATIONS

Plonsey, Robert and Collin, Robert E., Principles and Applications of Electromagnetic Fields, McGraw-Hill, 1961.

Primary Examiner—Robert L. Griffin
Assistant Examiner—Albert W. Watkins
Attorney, Agent, or Firm—Herman J. Hohauser

[57] ABSTRACT

A wireless communication system for simultaneously operating a plurality of portable communication devices each having a fixed station on different frequencies within a specified area without harmful interference caused by receiver desensing and intermodulation products.

2 Claims, 2 Drawing Figures

COMMUNICATION SYSTEM TO SIMULTANEOUSLY OPERATE A PLURALITY OF RF TRANSCEIVERS IN A CONFINED AREA

This application is a continuation of application Ser. No. 286,256, filed July 31, 1981.

BACKGROUND OF THE INVENTION

Prior two-way radio communication systems have been concerned with producing as large a dynamic range as practical to provide communication over a large area. The present invention discloses a method whereby a plurality of portable units can operate within a few feet of each other, all within a predetermined dimensioned enclosed area, and communicate simultaneously each with its own base unit on different frequencies in the same band without harmful interference. When interference occurs, an individual has difficulty in communicating clearly with someone on the other end of a radio link because other radio signals somehow jam or interfere with the conversation in progress. If this interference precludes normal conversation from occurring, it is called harmful interference. Occasional static, strange sounds or voices being heard by the users that does not affect a conversation in progress is not considered harmful interference. If the communication link is for data transmission, interference would be considered harmful if transmission errors occur that could not be corrected by digital techniques.

Prior art in this specific area is truly limited. As disclosed in U.S. Pat. No. 4,152,648 by Delogne, a radio-communication system for confined spaces merely discloses a radiating transmission line. U.S. Pat. No. 4,165,487 describes a low power communication system that provides for only one-way transmission and uses only one frequency. Indeed, there are situations where many discrete communication channels need to be operating simultaneously in a limited area without interfering with each other. Prior communication systems operate portable transceivers at output power levels of +30 dBm or more and receive sensitivities at a minimum of −115 dBm. This results in a dynamic range in excess of 145 dB. This wide dynamic range is very useful where maximum area coverage is desired. However, a wide dynamic range in a confined area, where portable units are relatively close to base antennas and to each other, will cause harmful interference to other units operating in the system. If the variations in signal strengths between the portable units and base units are minimized as the portable moves about the confined area, then a system could be designed such that any spurious signals generated would be near or below the threshold level of sensitivity of the receivers in the system.

If several two-way radios operate in close physical proximity on different frequencies in the same band, receiver desensitization and spurious signals such as intermodulation (IM) products result in interference. A very severe interference problem results when third order intermodulation products are generated when the mixing of radio signals occur. The offending signals on frequencies $F_1$ and $F_2$ are generated according to the well known equations:

$$2A - B = F_1 \quad (1)$$

$$A + B - C = F_2 \quad (2)$$

where:
 $A$ = Tx freq 1
 $B$ = Tx freq 2
 $C$ = Tx freq 3
 $F_1, F_2$ = Intermodulation (IM) product frequencies Where frequency $F_1$ or $F_2$ coincides with another users frequency, interference occurs. Fifth and seventh order IM products are also generated but usually their energy levels are so low that they do not cause harmful interference.

Intermodulation products become significant when two strong radio frequency (RF) fields exist at the same point and mixing takes place. One of the places this mixing can occur is in the transmitter output stages of each unit transmitting. This is called high level mixing. In the case of several portable radios operating within a few feet of each other and two or more are transmitting simultaneously, RF energy radiated from the antenna of each unit is received by the other transmitting antennas and is coupled back to each transmitter's output amplifying stage. This results in a mixing of the signals whereby intermodulation products are formed and reradiated by the transmitting antenna.

Mixing can also occur in the front-end stages of a radio receiver. When two strong signals are present at the input of a receiver, mixing can take place and IM products are internally generated. This is called receiver IM.

Careful selection, then, of the portable transmitter frequencies is imperative. No IM product should form under any combination of portable transmit frequencies which coincide with other portable receiver frequencies. Even if variations in the signal strength from portable to base are minimized, weak signals generated spuriously in the portable's transmitter output stages will be received by other portables operating close by in the receive mode. Further, front-end mixing will invariable take place due to the close proximity of other portables transmitting. IM products in the portable transmit frequency range are unavoidable; however, they can be minimized so that these spurious signals do not interfere with bona fida signals received by any base unit receiver.

Another very severe interference problem is receiver desensitization. Receivers are desensitized when a strong RF signal in the same band as the receiver appears at the receiver input. If the signal is on the frequency the receiver is tuned to, then no problems exists. However, if the signal is not on the receiver frequency, the receiver will be desensitized and be hampered from receiving weaker signals coming in that are on the receiver frequency. Without protection from strong signals, harmful interference will result when a plurality of portable radio units operate in close proximity using prior art techniques.

SUMMARY OF THE INVENTION

The present invention solves the difficulties encountered when a plurality of portable radio transmitter-receivers (transceivers) are operated in a confined space. The portable radio transceivers (portables) are small devices that can be hand-carried or mounted on a users belt. The person carrying this device can be anywhere within the predetermined dimensioned enclosed area and communicate with his or her associated base unit without harmful interference from other portable or base units. The present invention discloses a wireless communication system whereby RF energy from each of the base unit transmitters are mixed together through a commercially available linear transmitter combiner. The combined signal output from this combiner is fed through a transmission line to an antenna system which distributes the RF energy in the operating area. The antenna system could be one or several commercially available antennas or radiating transmission lines or a combination of these.

A similar antenna system is utilized for the base unit receiving. Signals received by the receiving antenna system travel through a transmission line through a pre-selector to a receiver multicoupler. The receiver multicoupler feeds each of the base unit receivers. The present invention discloses the insertion of a protective pad added in series with the antennas in the portable units in the operating area. In the preferred embodiment, the protective pad is a non-reactive attenuator. Its primary purpose is to reduce high-level mixing in the transmitter output stage of the portable radio. Its secondary purpose is to reduce the effective receiver sensitivity and improve receiver IM rejection. Each channel is further protected by the use of sub-audible tones to prevent any receiver from "hearing" any signals on that channel that does not have the specific tone the receiver is designed to respond to. The present invention utilizes unique equations which determine the operating frequencies. Classical system gain versus system loss equations are used to determine transmitter power output.

By implementing the means described herein, the present invention realizes an effective, virtually interference-free communication system enabling a plurality of portable units a two-way communication link with their associated base units in a confined area.

DESCRIPTION OF THE PREFERRED EMBODIMENT

Figure 2:
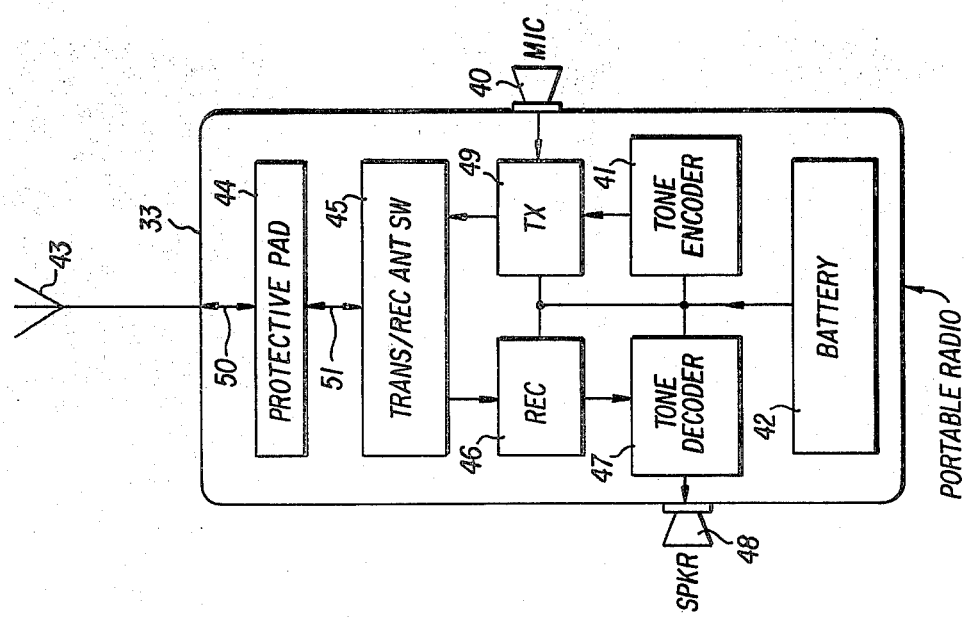
FIG. 2 shows a portable radio of the preferred embodiment.

I. Determination of the System Operating Frequencies to be Used

The system operating frequencies are the frequencies that all transmitters and receivers operate on in the system disclosed.

To prevent any IM signals generated by the mixing formula shown in equation (1) from coinciding with a portable's receive frequency, the transmit frequencies must be carefully selected. The following equations disclose the means to determine the system operating frequencies, bandwidth and the transmit-receive split in which the system can operate:

$$2F_2 - F_3 = F_4 \tag{3}$$

$$F_2 - S = F_1 \tag{4}$$

$$S + F_3 = F_4 \tag{5}$$

$$F_2 + B = F_4 \tag{6}$$

$F_1$ = lowest portable receiver frequency
$F_2$ = lowest portable transmitter frequency
$F_3$ = highest portable receiver frequency
$F_4$ = highest portable transmitter frequency
S = the separation (or split) in frequency between a given portable's receive and transmit frequencies and is the same for all portables
B = the bandwidth needed for the portable transmit frequencies (or receive frequencies since they only differ by a constant S)

The total bandwidth of the system is the difference between the lowest portable receiver frequency, $F_1$, and the highest portable transmit frequency, $F_4$. The total bandwidth, TB, is determined as follows:

$$TB = (F_3 - F_1) + G + (F_4 - F_2) \tag{7}$$

where: G = the guard band between $F_3$ and $F_2$ and $$G = F_2 - F_3 \tag{8}$$

Thus the equation (5) is more simply expressed as:

$$TB = F_4 - F_1 \tag{9}$$

Since the highest and lowest frequencies within which the system operates is governed by regulation or other parameters, $F_1$ and $F_4$ are already determinable. Using equations (3) through (6) above, $F_2$, $F_3$, B and S are determined. In some instances, S is predetermined, in which case $F_2$, $F_3$ and B can be calculated.

If the operating frequencies are determined in this fashion, third order IM signals that result according to the mixing formula shown in equation (2) will not cause interference. For the frequencies determined by equations (3) through (6), the following relationship is always true:

$$F_2 + (F_2 + d) - F_4 > F_3 \tag{10}$$

where:
$F_2$, $F_3$ and $F_4$ are defined above, and
d = the channel spacing which is the difference in frequency between two adjacent operating frequencies In essence, the worst operating situation occurs when the highest portable transmitter frequency is subtracted from the sum of the lowest portable transmit frequencies. For the frequencies determined by equations (3) through (6), the result of any such mixing will always result in a frequency that is above the highest portable receive frequency, $F_3$.

Once the limits of the portable's transmit and receive frequencies are calculated, the number of channels that can be used in that spectrum is given by:

$$N = B/d \tag{11}$$

where:
N = the number of channels available
B = the bandwidth as defined earlier
d = the channel spacing as defined earlier Then the portable receive frequencies are:

$$F_m = (m-1)d + F_1 \tag{12}$$

where: $F_m$ = a portable receive frequency as m goes from 1 to N.

The portable transmit frequencies are then given by $(F_m + S)$.

The base unit frequencies are reciprocal of the portable's frequencies. That is, if a portable unit transmits on a frequency X and receives on a frequency Y then the base unit receives on frequency X and transmits on frequency Y.

II. Description of the Base Unit System and Propagation Loss

Figure 1:
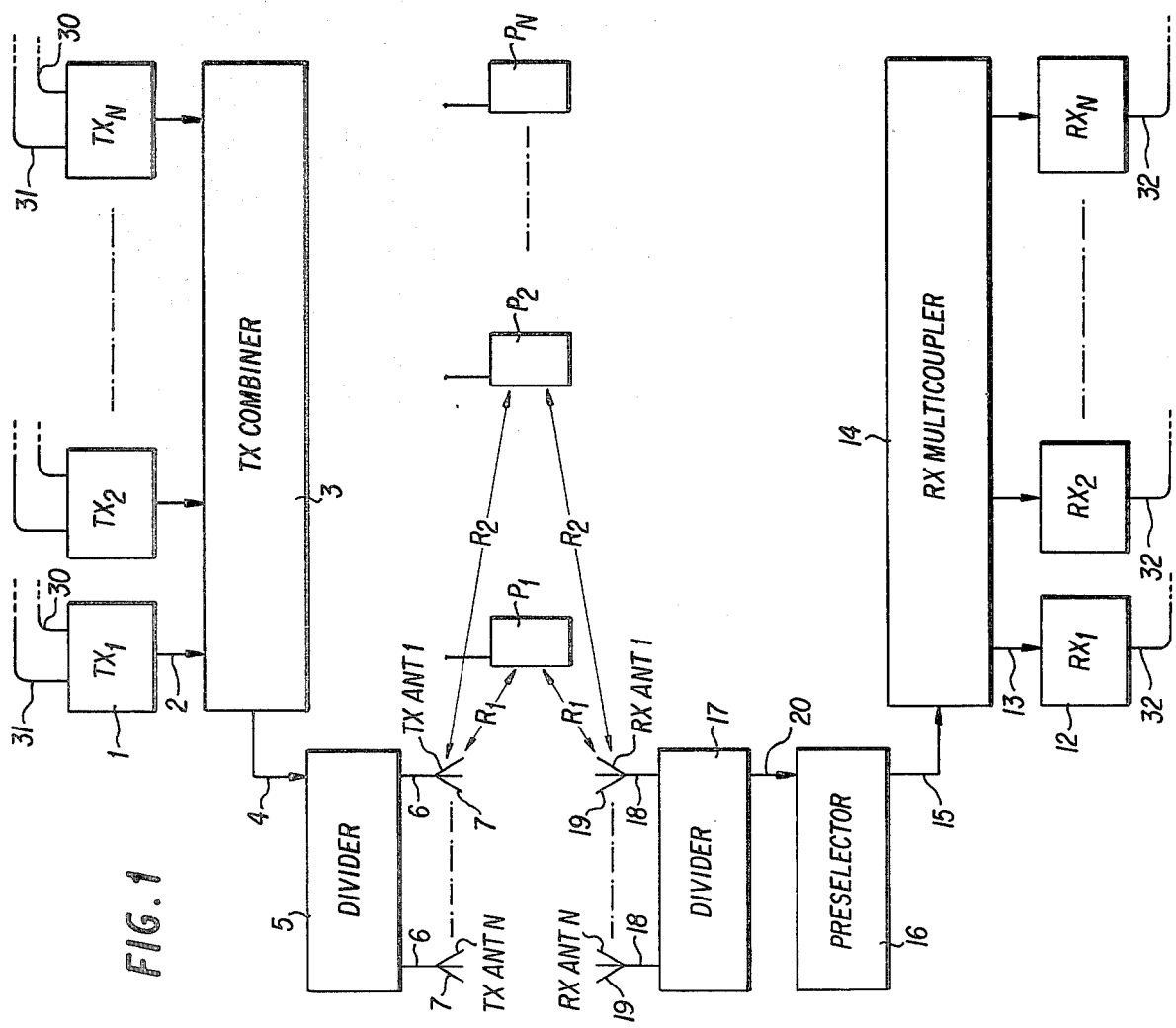
FIG. 1 shows an arrangement of base and portable units of the preferred embodiment.

Proceeding now with a detailed description of the method to implement the present invention, FIG. 1 is referenced. The base unit transmitters 1 are designated $TX_1$, $TX_2$ ... $TX_n$. $TX_1$ operates on frequency $F_1$, $TX_2$ operates on $F_1+d$ and $TX_n$ operates on $F_1+(n-1)d$. In the preferred embodiment these transmitters are housed in a cabinet separate from the cabinets housing the receivers 12. In an alternative embodiment, these transmitters 1 may be housed in the same enclosure as receivers 12. Commercial transmitters are available with a wide range of output powers. The selection of the power output of these transmitters is discussed later in Section IV of this description. Audio feeding the transmitters enters on a line 30 which is separate from the line 31 which activates the transmitter. The signals from each transmitter travel along their respective transmission cables 2 and are combined together by means of a transmitter combiner 3. The transmitter combiner 3 is comprised of circulators, hi-Q cavities and critical length coaxial cables acting to linearly mix the signals from all the transmitters. The output of the combiner 3 travels along a coaxial transmission line 4 to the transmitter antenna system. In the preferred embodiment, the main coaxial transmission cable feeds a passive power divider 5 which distributes the RF energy to the multiple base antennas 7 through antenna transmission cables 6. The base antennas are commercially available devices. In the preferred embodiment, a directional antenna is utilized, although other types can be used in alternative embodiments. The power divider 5 is composed of critical length coaxial cables connected with "T" connectors.

In an alternative embodiment, the antenna system may be comprised of a single antenna or other radiating means, such as radiating transmission lines (not shown).

The receiver antenna system, comprised of divider 17, cables 18 and antennas 19 of the base units is identical to and independent of the transmitter antenna system in the preferred embodiment. Signals radiating from the portable unit transmitters are picked up by the receiving antenna and fed through a transmission line 20 through a pre-selector 16. The pre-selector 16 allows only signals between $F_4$ and $F_2$ to reach the receiver multicoupler 14. The multicoupler 14 is comprised of either passive power dividers or active tuned circuits. The multicoupler 14 distributes all the RF energy present on its input cable 15 to each and every base unit receiver via coaxial cables 13. Each base unit receiver selectively tunes in the frequency it is designed to operate on and feeds the demodulated audio signal through its respective cables 32. Not shown in the figure for simplicity and understood to be present are conventional power supplies for all transmitters 1, receivers 12 and multicoupler 14.

The combined signals from the transmitter combiner 3 radiating from the antennas 7 travel a distance in space in the confined area and reaches all portable radio units $P_1$, $P_2$ ... $P_n$. All portable unit receivers are subject to all signals but will only receive the frequency it is tuned to operate on in the range from $F_1$ to $F_3$. Similarly, signals radiating from portable units $P_1$, $P_2$ ... $P_n$ will reach their respective base unit receivers through the base unit antenna system 17, 18, 19 as described above.

In an alternative embodiment, a single antenna system and a duplexer is employed. In this embodiment, both the output of the transmitter combiner 3 appearing on a transmission line 4 and the input of the receiver multicoupler 14 appearing on a transmission line 15 are connected to a single antenna system by means of a duplexer (not shown).

The antennas are placed in the confined area and as explained below, the closest a portable can be to any base unit antenna is called distance $R_1$. The maximum distance any portable unit can be removed from any base antenna is represented by distance $R_2$. The dynamic operating range of the system for the present invention is determined by the relation:

$$D = L_2 - L_1 \quad (13)$$

where:
D = the dynamic operating range, in dB
$L_2$ = the propagation loss a radio signal experiences along distances $R_2$, in dB
$L_1$ = the propagation loss a radio signal experiences along distances $R_1$, in dB and the free space propagation loss, L, is given by the classical relation:

$$L = 36.6 + 20 \log f + 20 \log r \quad (14)$$

where:
L = loss in dB
f = frequency in MHz
r = distance in miles

The base antennas 7, 19 must be placed in the area to minimize the dynamic operating range, D. In the preferred embodiment, the base antennas 7, 19 are unidirectional antennas placed high above the service area with the maximum lobe pointing down on this area. Thus no portable $P_n$ can get very near to the base antennas 7, 19.

With the base antennas placed such that the distances $R_1$ and $R_2$ are minimized, $L_1$ is comparable to the value of $L_2$ making the difference between them small. Thus a compressed dynamic range is realized.

In the preferred embodiment of the system, the propagation loss is simply the free space loss since all portable units will have line-of-sight to the base antennas. In alternative embodiments, the radio signals may experience other propagation losses as they travel through walls or other structures. If this is the case, these propagation losses need to be empirically determined and then added to the worst case loss $L_2$ in order to determine the dynamic operating range of the system. In such instances, the base antennas are placed such that the difference between $L_1$ and the new $L_2$ is minimized.

III. Description of the Portable Radio

Turning now to FIG. 2, the portable radio 33 in the preferred embodiment is described. All RF signals are radiated from and received by the antenna 43 which is a short whip mounted on top of the radio unit. The RF signals travel through a protective pad 44. In the preferred embodiment, the pad 44 is a non-reactive attenuator made up of resistors and is designed to introduce a signal loss to RF energy passing through it. The insertion loss of this pad will be determined by the distances $R_1$ and $R_2$ and other system losses. Typical values are between 10 to 20 dB. The pad 44 accomplishes the following:

1. Reduces the transmitted energy reaching the antenna;
2. Reduces the effective receiver sensitivity;
3. Improves the receiver IM rejection;
4. Reduces the level of IM products resulting from high level mixing in the transmitter output stage.

The protective pad 44 has input and output impedances that match the respective impedances of the receiver, transmitter and antenna. In an alternative embodiment, an RF circulation device, also referred to as an isolator, is put on the output of the transmitter in the portable in addition to any non-reactive attenuator. This circulation device allows RF signals to flow in one direction without experiencing significant loss, while any RF signals traveling in the other direction experience a large loss. Also, alternatively, separate attenuators may be used for the receiver and transmitter.

A transmit-receive switching means 45 couples the receiver and transmitter to the antenna 43 through the pad 44. The remaining aspects of the portable radio operation are conventional. The microphone picks up the user's voice and modulates the transmitter 49. The sub-audible tone encoder 41 also modulates the transmitter continuously with a sub-audible tone. The receiver 46 demodulates the RF signal received and when a sub-audible tone is decoded by the tone decoder 47, the speaker 48 is enabled, allowing the user to hear any messages on the channel. The speaker 48 could be replaced with an earphone or earplug (not shown). A battery 42 provides the power for all active elements in the portable.

In an alternative embodiment, the receiver and transmitter in the portables may be enclosed in separate cases with or without a common power source.

IV. Determination of Transmitter Power Outputs

The RF power output of all transmitters is the minimum necessary to achieve an acceptable operating margin. Generally, a system operating margin of 20 db or more is acceptable in the industry. The following classical realtionships are used in calculating this operating margin:

| | | |
|---|---|---|
| (15) Operating Margin, dB | = Received Power, dBm | − Receiver Sensitivity, dBm |
| (16) Received Power | = System Gain, dBm | − System Loss, dB |
| Where: | | |
| (17) System Gain, dBm | = The Transmitter power output in dBm | |
| (18) System Loss, dB | = The sum of all losses which include: free space loss loss due to protective pads 15 dB system use factor loss through the transmitter combiner or receiver multicoupler transmission cable losses loss due to power dividers | |

For a given installation of the present invention, all the above losses are determinable except the loss due to the protective pad 44. The amount of attenuation the pad provides is maximized in order to minimize spurious IM signals being generated while allowing practical transmitter power (20 to 30 dBm) to be utilized. The use of the protective pad in the portable unit lowers the effective radiated power of the portable. Thus the attenuation value of the pad and the transmitter power output are chosen such that the resulting weak RF fields will not desense the receiver of any nearby portable. Similarly, when energy from the base unit transmitters experience their loss through the combiner, transmission cables, power dividers and propagation through the shortest distance $R_1$, the resulting RF field in the service area is so weak that it will not desense any portable receiver operating in that area. Since the transmitter combiner 3 introduces more loss to a signal than the receiver multicoupler 14, the base unit transmitters have more power output than the portable unit transmitters in order to have a comparable system operating margin in both directions.

After the system losses listed in (18) are determined, the optimum power output and the value of the insertion loss of the portective pad can easily be determined through the use of relationships (15) through (18) above.

Having thus described my invention, I hereby claim:

1. In a method of eliminating interference in a wireless communication system located in a predetermined dimensioned enclosed area wherein said system includes at least three portable receiving and transmitting units;

at least three base receiving means;

at least three base transmitting means;

base transmitter radiating means;

base receiver radiating means; and portable receiver and transmitter radiating means wherein all of said portable receiving and transmitting units, said base receiving means and said base transmitting means can operate simultaneously when there is movement of said portable units in said predetermined dimensional enclosed area comprising the steps of:

connecting the output signal of each of said base transmitting means to its respective signal radiating means;

connecting the input signal of each of said base receiving means to its respective signal radiating means;

connecting the output and input signals of each of said portable receiving and transmitting units to its respective signal radiating means;

positioning said base transmitter radiating means and said base receiver radiating means so that the difference between the minimum propagation loss and the maximum propagation loss between said base transmitter radiating means and portable receiver and transmitter radiating means is minimized and the difference between said base receiver radiating means and said portable receiver and transmitter radiating means is minimized;

reducing high level mixing and receiver IM in said portable receiving and transmitting units; and selecting transmitter power outputs such that an acceptable system operating margin is achieved and which at the same time avoids RF fields that would result in harmful desensitization of said portable receiving and transmitting units;

the improvement of selecting system operating frequencies such that all third order intermodulation products generated from the mixing of signals are different from operating frequencies of any of said portable receiving and transmitting units is achieved in accordance with the formulas:

$$2F_2 - F_3 = F_4$$

$$F_2 - S = F_1$$

$$S + F_3 = F_4$$

$$F_2 + B = F_4$$

$$(m-1)d + F_1 = F_m$$

where
- $F_m$ = A portable receive frequency as m goes from 1 to N
- $d$ = the channel spacing which is the difference frequency between two adjacent operating frequencies
- $F_1$ = lowest portable receiving unit frequency
- $F_2$ = lowest portable transmitting unit frequency
- $F_3$ = highest portable receiving unit frequency
- $F_4$ = highest portable transmitting unit frequency
- $S$ = the separation (or split) in frequency between a given portable's receive and transmit frequencies and is the same for all portables
- $B$ = the bandwidth needed for the portable transmit frequencies (or receive frequencies since they only differ by a constant S).

2. In a wireless communication system for use in a predetermined dimensioned enclosed area comprising:
- at least three portable receiving and transmitting units $(P_1 - P_n)$;
- at least three base receiving means $(RX_1 - RX_N)$;
- at least three base transmitting means $(TX_1 - TX_N)$;
- base transmitter radiating means;
- base receiver radiating means;
- portable receiver and transmitter radiating means;
- transmitter combiner means electrically connected to all said base transmitting means for coupling signal outputs of said base transmitting means to said base transmitter radiating means;
- receiver multicoupling means electrically connected to all said base receiving means for coupling signal inputs of said base receiver radiating means to said base receiving means; and
- passive signal reducing means connected to each of said portable receiving and transmitting units for minimizing high level mixing in each said portable receiving and transmitting units and for minimizing the internal generation of receiver intermodulation products in each said portable receiving and transmitting units
- whereby transmitter power outputs are generated that result in acceptable system operating margins and simultaneously avoid RF fields of a magnitude that would result in receiver desensitization in each of said portable receiving and transmitting units, and upon the difference between the minimum propagation loss and the maximum propagation loss between said base transmitter radiating means and said portable receiver and transmitter radiating means being minimized, and upon the difference between the minimum propagation loss and the maximum propagation loss between said base unit receiver radiating means and said portable receiver and transmitter radiating means being minimized, all said base receiving means, said base transmitting means and said portable receiving and transmitting units are capable of simultaneous operation while all said portable receiving and transmitting units are in constant movement within the said enclosed area the improvement of having all third order intermodulation products generated from the mixing of the signal outputs of each of said portable receiving transmitting units being different from any operating frequencies of said portable receiving and transmitting units in accordance with the following formulas:

$$2F_2 - F_3 = F_4$$

$$F_2 - S = F_1$$

$$S + F_3 = F_4$$

$$F_2 + B = F_4$$

$$(m-1)d + F_1 = F_m$$

where
- $F_m$ = A portable receive frequency as m goes from 1 to N
- $d$ = the channel spacing which is the difference frequency between two adjacent operating frequencies
- $F_1$ = lowest portable receiving unit frequency
- $F_2$ = lowest portable transmitting unit frequency
- $F_3$ = highest portable receiving unit frequency
- $F_4$ = highest portable transmitting unit frequency
- $S$ = the separation (or split) in frequency between a given portable's receive and transmit frequencies and is the same for all portables
- $B$ = the bandwidth needed for the portable transmit frequencies (or receive frequencies since they only differ by a constant S).

* * * * *